(12) United States Patent
Picard

(10) Patent No.: US 10,086,944 B2
(45) Date of Patent: Oct. 2, 2018

(54) REVERSIBLE UPHOLSTERY DRESS COVER

(71) Applicant: Franklin Products, Inc., Torrington, CT (US)

(72) Inventor: Jeffrey M. Picard, Watertown, CT (US)

(73) Assignee: Franklin Products, Inc., Torrington, CT (US)

( * ) Notice: Subject to any disclaimer, the term of this patent is extended or adjusted under 35 U.S.C. 154(b) by 371 days.

(21) Appl. No.: 15/091,088

(22) Filed: Apr. 5, 2016

(65) Prior Publication Data
US 2016/0297535 A1 Oct. 13, 2016

Related U.S. Application Data

(60) Provisional application No. 62/144,053, filed on Apr. 7, 2015.

(51) Int. Cl.
*A47C 27/00* (2006.01)
*B64D 11/06* (2006.01)
*A47C 31/11* (2006.01)

(52) U.S. Cl.
CPC .......... *B64D 11/0647* (2014.12); *A47C 31/11* (2013.01)

(58) Field of Classification Search
CPC ............................ B64D 11/0647; A47C 31/11
USPC ................................ 297/218.5, 218.4, 218.3
See application file for complete search history.

(56) References Cited

U.S. PATENT DOCUMENTS

| | | | |
|---|---|---|---|
| 1,515,711 A | 1/1924 | Van Hove | |
| 2,738,835 A * | 3/1956 | Eames | A47C 3/12 |
| | | | 297/218.4 |
| 2,865,436 A * | 12/1958 | Thorne | A47C 7/282 |
| | | | 297/218.1 |
| 2,994,887 A * | 8/1961 | Thornton | A47K 13/14 |
| | | | 297/218.4 |
| 3,024,068 A * | 3/1962 | Eames | A47C 4/30 |
| | | | 160/395 |
| 3,295,887 A * | 1/1967 | Bacon | B60N 2/6027 |
| | | | 224/275 |

(Continued)

FOREIGN PATENT DOCUMENTS

| | | |
|---|---|---|
| CN | 203828461 U | 9/2014 |
| EP | 2698081 A1 | 2/2014 |

OTHER PUBLICATIONS

International Search Report for corresponding PCT/US2016/026369 dated Aug. 18, 2016.

*Primary Examiner* — Syed A Islam
(74) *Attorney, Agent, or Firm* — McCormick, Paulding & Huber LLP

(57) ABSTRACT

A reversible upholstery dress cover article includes a fabric web, an obverse finish layer covering an obverse face of the web, a reverse finish layer covering a reverse face of the web, a relatively flexible tape attached around an edge of the web, and a relatively stiff ribbon attached in the tape. The tape spaces the ribbon apart from the edge of the web and the tape can be folded to bring the ribbon against either the obverse finish layer or the reverse finish layer without folding the web. The tape is folded around the ribbon in a first fold so that the ribbon extends along a midline of the tape, then each edge of the tape is folded back in a second fold to form flaps that extend beyond the first fold, with the ribbon protruding from the folded tape.

18 Claims, 4 Drawing Sheets

(56) References Cited

U.S. PATENT DOCUMENTS

| | | | | |
|---|---|---|---|---|
| 3,298,743 | A * | 1/1967 | Albinson | A47C 7/185 297/218.5 |
| 3,671,984 | A * | 6/1972 | Ambrose | B60N 2/707 5/402 |
| 3,677,601 | A * | 7/1972 | Morrison | A47C 4/022 297/248 |
| 4,089,497 | A * | 5/1978 | Miller | A47B 95/043 248/118 |
| 5,318,348 | A * | 6/1994 | Hess | A47C 31/023 297/440.11 |
| 5,733,001 | A * | 3/1998 | Roberts | B60N 2/5825 24/297 |
| 5,762,403 | A * | 6/1998 | Robinson | A47C 5/06 297/440.11 |
| 6,102,482 | A * | 8/2000 | Dettoni | A47C 7/16 297/440.11 |
| 6,296,307 | B1 | 10/2001 | Holtke | |
| 6,406,093 | B1 * | 6/2002 | Miotto | B60N 2/5825 297/218.3 |
| 7,901,002 | B2 * | 3/2011 | Mashimo | B60N 2/5825 297/218.3 |
| 8,240,759 | B2 * | 8/2012 | Hobl | B60N 2/5825 297/218.1 |
| 8,926,013 | B2 * | 1/2015 | Kurashita | B60N 2/7011 297/218.3 |
| 9,193,286 | B2 * | 11/2015 | Okuyama | B60N 2/5825 |
| 2011/0049948 | A1 | 3/2011 | Hobl et al. | |

* cited by examiner

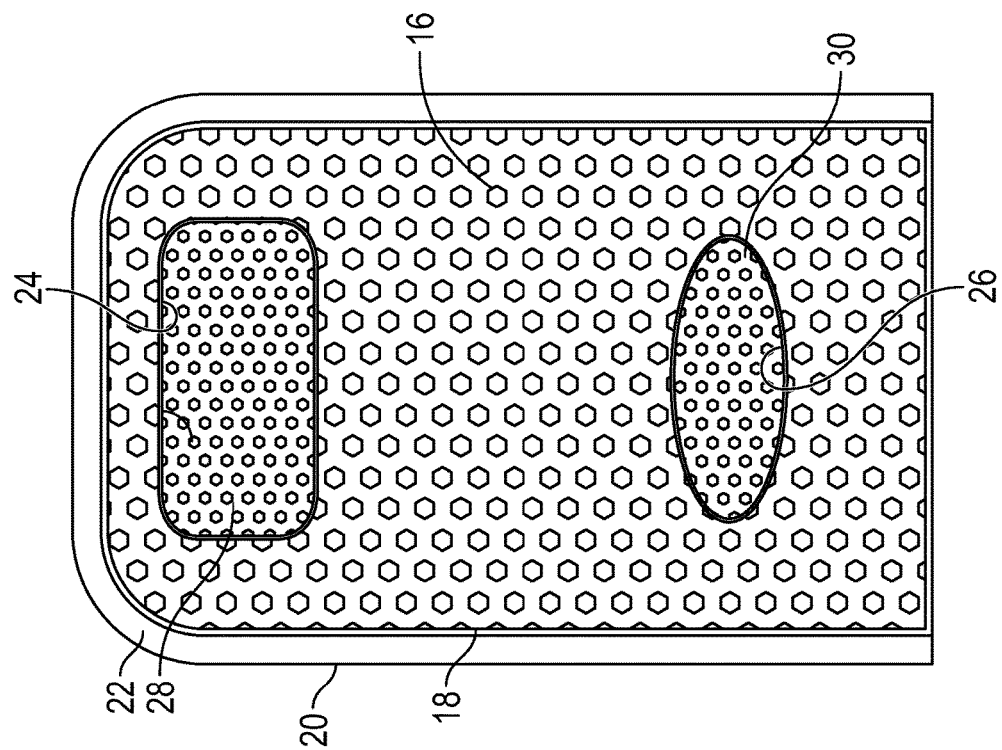
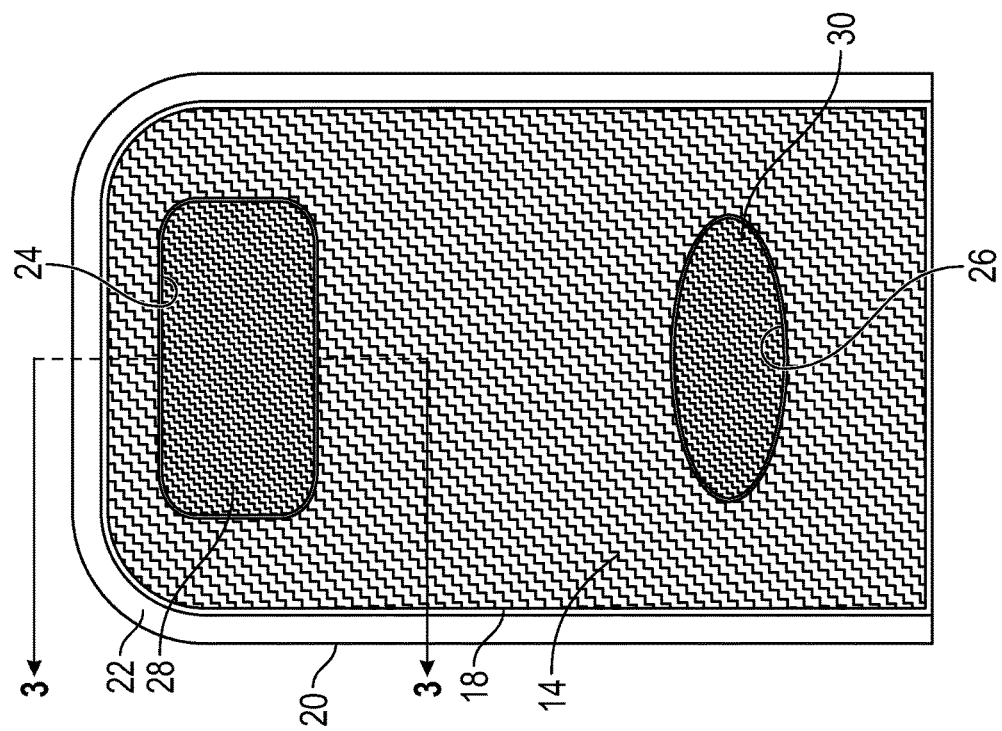
FIG. 1
FIG. 2

REVERSIBLE UPHOLSTERY DRESS COVER

CROSS-REFERENCE RELATED APPLICATIONS

This application is a non-provisional and claims the benefit under 35 USC § 119(e) of U.S. Patent Application Ser. No. 62/144,053 filed Apr. 7, 2015, hereby incorporated by reference.

BACKGROUND

Technical Field

The invention relates to seating arrangements, and, more particularly, to decorative upholstery covers for cushioned seats.

Discussion of Art

Aircraft seat upholstery typically consists of cushioning covered with a dress cover that provides a finishing level of comfort and appearance. The covers normally are designed to be removable for cushion and seat maintenance. However, in the case of fabric covers the main reason is for dry cleaning. The removal, cleaning and reinstallation of dress covers is a significant burden on the airline.

Lengthening the interval between cleanings can easily provide large savings. For example, if the covers were reversible, the frequency of cleaning could be cut drastically. Covers would be removed and reversed and then dry cleaned every other cycle, when both sides could be cleaned at the same time. Two sides could be cleaned for the cost of one. In addition, the lower number of cleaning cycles per cover would lessen wear and tear from dry cleaning and the airline would need fewer spares. Another approach to extending the service life of a removable cover would be to continue using a certain side in the usual manner until it becomes worn and then switching to the other. When the first wear surface gets worn, a new one can be presented by reversing the cover.

A reversible upholstery cover also would offer opportunities to lower the cost of having multiple cabin styling options. Two interchangeable colors for example; without having to inventory separate part numbers.

Unfortunately, the design and construction of conventional covers does not lend itself to being reversible. This is mostly due to the way they are attached to the seat. Various removable methods are used to secure them in place, including welt cords, hook and loop fasteners, "J" clips, etc. The most common method is combinations of hook and loop fasteners. Although widely accepted, such fastening methods can lead to complicated designs and construction, adding significantly to the price of a cover. Importantly these fastening methods are not intended to be reversible. When the normally unseen side of the cover is revealed, the fasteners become visible and unsightly. Also, allowing the fasteners to remain exposed to the occupant is unacceptable. Adding a duplicate set of fasteners to accommodate the second side of the cover not only drastically increases the cost but adds too much bulk in certain areas, affecting aesthetics and comfort. Such covers would also end up heavier and cumbersome to remove and install, causing higher operating and maintenance costs.

BRIEF DESCRIPTION

Embodiments of the invention provide an upholstery cover of simplified design and construction that makes possible a practical reversible cover. Two usable finish layers are supplied on a single cover. The airline can simply remove the cover, flip it over and reinstall to present a fresh upholstered surface. The upholstery cover has a unique arrangement of attachment elements that allows the cover to be reversed.

More particularly, embodiments of the invention provide a reversible upholstery dress cover article that includes a fabric web, an obverse finish layer covering an obverse face of the web, a reverse finish layer covering a reverse face of the web, a relatively flexible tape attached around an edge of the web, and a relatively stiff ribbon attached in the tape. The tape spaces the ribbon apart from the edge of the web and the tape can be folded to bring the ribbon against either the obverse finish layer or the reverse finish layer without folding the web. The tape is folded around the ribbon in a first fold so that the ribbon extends along a midline of the tape, then each edge of the tape is folded back in a second fold to form flaps that extend beyond the first fold, with the ribbon protruding from the folded tape. The tape is relatively flexible in that it does not spring back out of its folded position when external force is removed. The ribbon is relatively stiff in that it does spring back to its original position when external force is removed.

The cover can be laminated to have patterned embossing used for styling. For example, the two finish layers each can have a unique pattern that can include variations in the depth and width of the elements making up the design.

While the described cover is presented as a solution for aircraft seats it is easily recognized that the same benefits would be available for other types of seating. The type of cover described could also be used on both residential and commercial furniture and various forms of mass transit seating.

Certain exemplary embodiments, as briefly described above, are illustrated by the following figures.

DRAWINGS

FIG. 1 shows an obverse face of a reversible upholstery dress cover according to an embodiment of the invention.

FIG. 2 shows a reverse face of the cover of FIG. 1.

DETAILED DESCRIPTION

Figure 3:
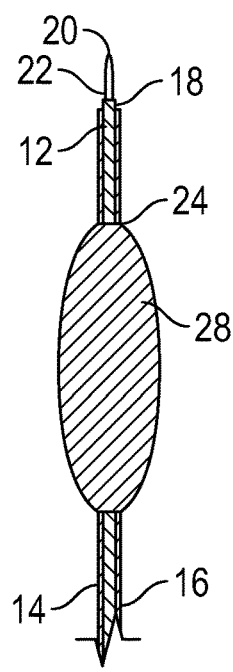
FIG. 3 shows a side sectional view of the cover of FIGS. 1-2.

Referring to FIGS. 1-3, a reversible upholstery dress cover 10 includes a fabric web 12 that is covered on an obverse face by an obverse finish layer 14, and on a reverse face by a reverse finish layer 16. The web 12 has a continuous edge 18, to which a ribbon 20 is attached by way of an accordion-folded tape 22. The ribbon 20 and the tape 22 provide for reversible attachment of the web 12 to a seat frame, as further discussed below.

The obverse finish layer 14 and the reverse finish layer 16 are shown as differently patterned, e.g. by embossments, but can be identically patterned. The finish layers and the fabric web can be formed of any sort of fabric, e.g. woven or non-woven cloth, plastic, leather or faux leather.

The fabric web 12 includes a head cutout 24 near one end of the web, and includes a lumbar cutout 26 near the other end of the web. Within the head cutout 24, a headrest pillow 28 is attached to the web 12. The headrest pillow 28 may be captured between the obverse finish layer 14 and the reverse finish layer 16, or the obverse and reverse finish layers may also have head cutouts in registry with the head cutout 24. Within the lumbar cutout 26, a lumbar pillow 30 is attached to the web 12. The lumbar pillow 30 may be captured between the obverse finish layer 14 and the reverse finish layer 16, or the obverse and reverse finish layers may also have lumbar cutouts in registry with the lumbar cutout 26. The headrest pillow 28 and the lumbar pillow 30 are attached to the web 12 so that in a free condition (not mounted to a seat) each pillow protrudes equally or symmetrically at either face of the web, as shown for the head pillow in FIG. 3.

Figure 4:
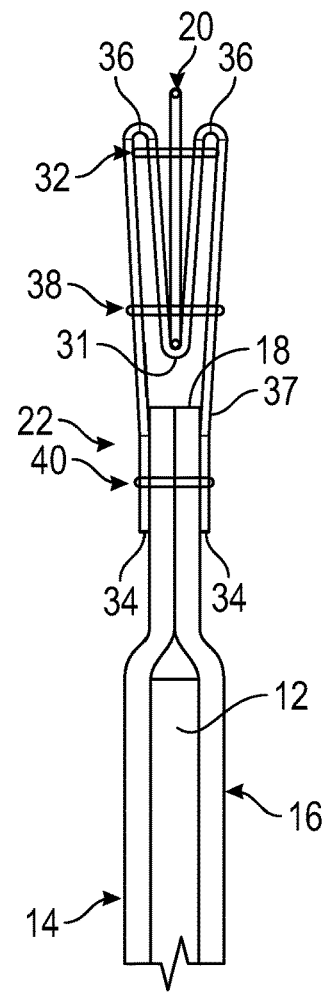
FIG. 4 shows a detail side sectional view of an attachment structure of the cover of FIGS. 1-3.
Figure 5:
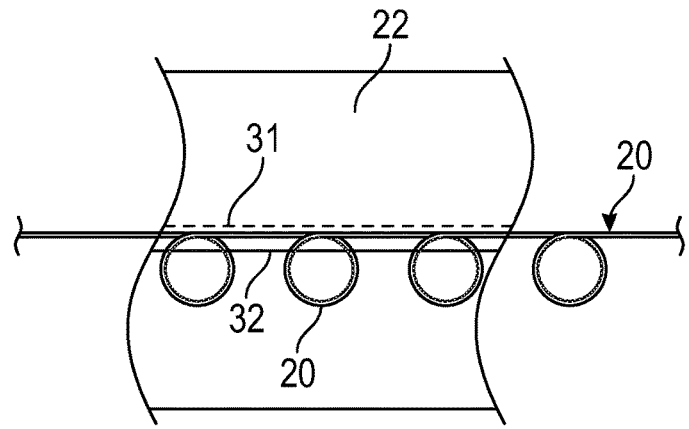
FIG. 5 shows a step of assembling the attachment structure of FIG. 4.
Figure 6:
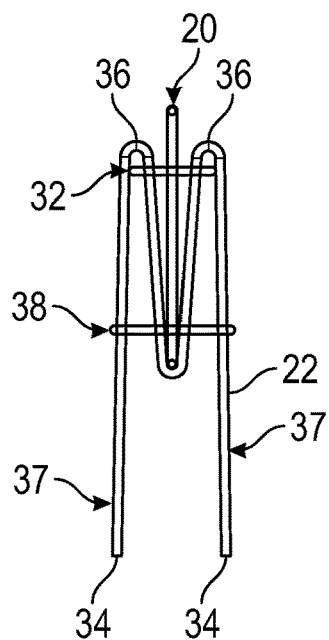
FIG. 6 shows further steps of assembling the attachment structure of FIG. 4.
Figure 7:
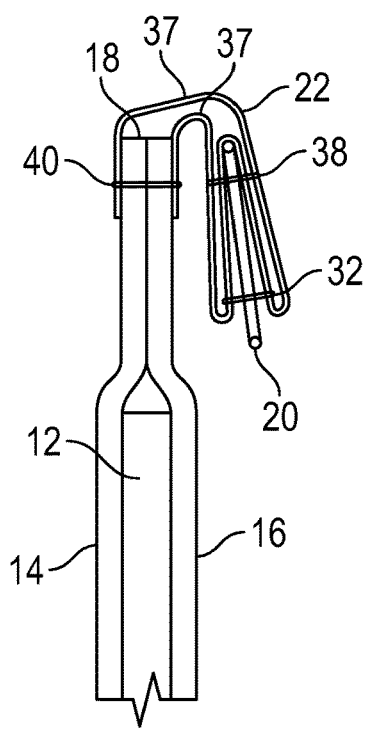
FIG. 7 shows a first position of the attachment structure of FIG. 4.
Figure 8:
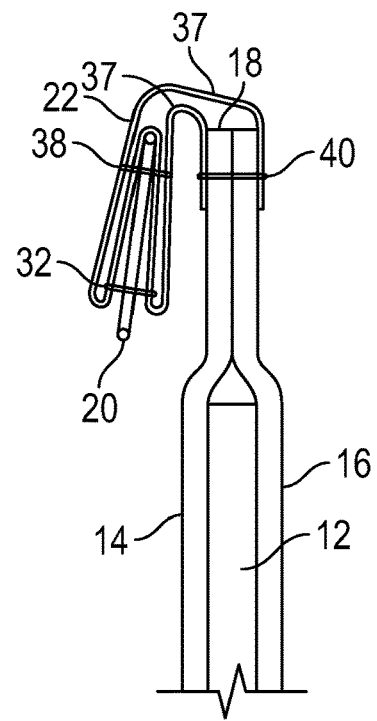
FIG. 8 shows a second position of the attachment structure of FIG. 4.

Referring to FIGS. 4-6, the ribbon 20 is attached to the web 12 by way of the accordion-folded tape 22. At a first step in assembling the ribbon and tape, as shown in FIG. 5, the ribbon 20 is placed at a midline 31 of the tape 22. The tape is folded at the midline 31 in a first fold. Then the ribbon 20 is stitched to the tape 22 by a first seam 32. The edges 34 of the tape 22 are folded back around the first seam 32 at second folds 36 to form symmetrical flaps 37. A second seam 38 then is stitched through the flaps 37 and through the ribbon 20. Finally, the flaps 37 of the tape 22 are attached to the edge 18 of the web 12 by a third seam 40. (Although the seams are described with reference to stitches, lines of adhesive may be equally effective). This arrangement of folds and seams leaves the ribbon 20 free to move with reference to the web 12. As shown in FIGS. 7-8, the ribbon 20 can be freely folded toward either the obverse finish layer 14 or the reverse finish layer 16.

Figure 9:
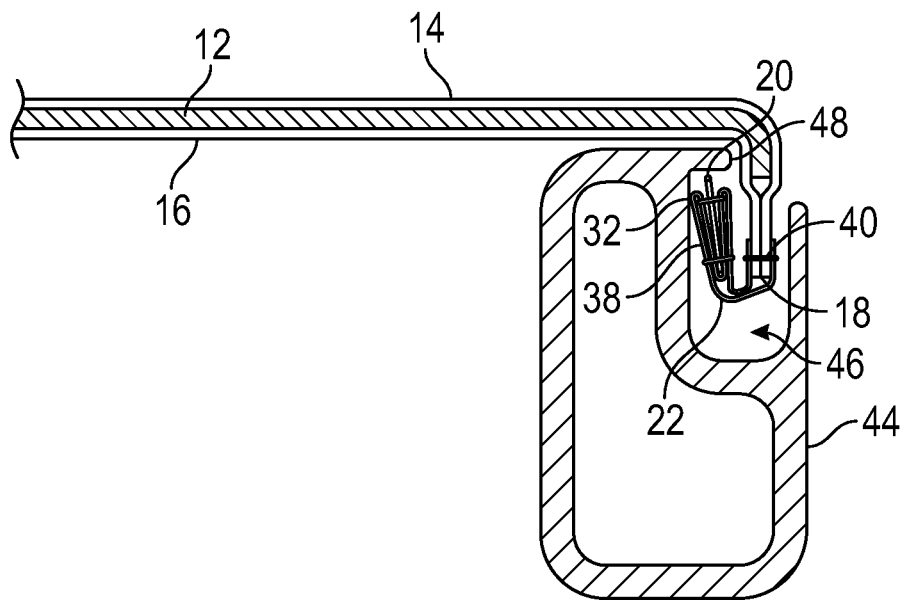
FIG. 9 shows a mode of attaching the cover of FIGS. 1-8 onto a seat frame, according to an embodiment of the invention.

By folding the ribbon 20 toward one or the other of the finish layers, the tape 22 and ribbon 20 are set up as an attachment structure for fastening the cover 10 onto a seat frame 44 with the one or the other of the finish layers against the frame. Thus, if the ribbon 20 is folded toward the reverse finish layer 16, as shown in FIG. 9, then the cover 10 can be attached to the seat frame 44 with the reverse finish layer against the frame. More particularly, as shown in FIG. 9, the cover 10 is attached onto the seat frame 44 by inserting the folded tape 22 and ribbon 20 into a groove or channel 46 that is formed in the seat frame. The groove or channel 46 includes a lip or overhang 48 that captures the ribbon 20, which then jams or wedges up against the walls of the channel when tension is placed on the fabric web 12. This is similar to the modes of attachment disclosed in co-pending and commonly owned U.S. patent application Ser. No. 14/677,494 filed Apr. 2, 2015, hereby incorporated by reference. The cover 10 can be removed from the seat frame 44 by simply releasing the end of the attachment ribbon 20 from the channel 46, then drawing the rest of cover's edge 18 from the channel 46 in a zipper fashion.

Figure 10:
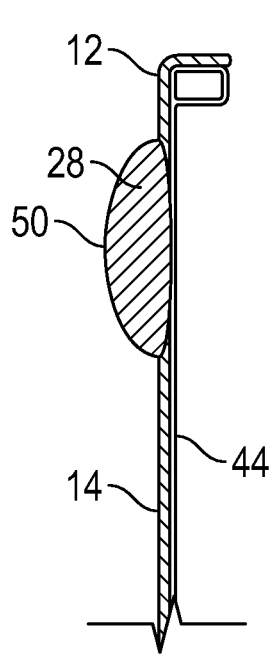
FIG. 10 shows a reversible pillow of the cover of FIG. 1.

Referring to FIG. 10, when the cover 10 is installed onto the seat frame 44, a cushion 50 is distended forward by the seat frame 44 pressing against the bulk of the head pillow 28 on the rear of the cover 10. When the cover 10 is reversed and the opposite side becomes the front, the same thing happens. What was the rearward portion of the head pillow 28 gets pushed forward to form the thickened headrest cushion 50. This self-orienting feature also can be used with integral bolsters or lumbar pads.

Figure 11:
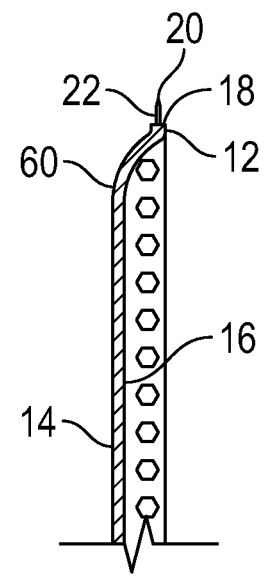
FIG. 11 shows a cupped corner of the cover of FIG. 1.

As an additional feature of the invention, the cover 10 using the described reversible attachment can be designed without conventional side boxings. This results in a simpler construction that is lighter and less expensive. The corners of the cover 10 can be formed in a unique way that aids in getting the cover to fit the seat frame 44 properly even after being reversed. Referring to FIG. 11, each corner 60 is cupped by gathering the cover's edge 18 as it is being sewn between the two tape flaps. This is done by sewing a tape 22 and a ribbon 20 that have a length shorter than the length of the cover's edge 18 where it rounds the corner 60. The resulting corner 60 retains a natural cupped or rounded-over shape that will readily spring into a mirrored cupped shape when the cover 10 is reversed.

Although exemplary embodiments of the invention have been described with reference to attached drawings, those skilled in the art nevertheless will apprehend variations in form or detail that are consistent with the scope of the invention as defined by the appended claims.

What is claimed is:

1. A reversible upholstery dress cover article comprising:
a fabric web;
an obverse finish layer covering an obverse face of the web;
a reverse finish layer covering a reverse face of the web;
a relatively flexible tape attached around an edge of the web; and
a relatively stiff ribbon attached in the tape,
wherein the tape spaces the ribbon apart from the edge of the web and the tape can be folded to bring the ribbon against either the obverse finish layer or the reverse finish layer without folding the web.

2. The article of claim 1 wherein the tape is folded around the ribbon in a first fold so that the ribbon extends along a midline of the tape, then each edge of the tape is folded back in a second fold to form flaps that extend beyond the first fold, with the ribbon protruding from the folded tape,
wherein the tape is attached to the ribbon by a seam between the folds and the tape is attached to the edge of the web by a seam through the flaps.

3. The article of claim 2 wherein the seams are stitched seams.

4. The article of claim 2 wherein the seam through the flaps passes through the obverse finish layer and the reverse finish layer.

5. The article of claim 1 wherein the web includes a first cutout with a first pillow attached to the web within the cutout.

6. The article of claim 5 wherein the first pillow is captured in the first cutout by the obverse finish layer and the reverse finish layer.

7. The article of claim 6 wherein the obverse finish layer and the reverse finish layer are attached to the web around the first cutout.

8. The article of claim 5 wherein in a free state the first pillow protrudes equally from obverse and reverse faces of the web.

9. The article of claim 1 wherein the obverse finish layer is patterned differently from the reverse finish layer.

10. The article of claim 1 wherein the ribbon is formed of overlapping loops of filament.

11. The article of claim 1 wherein corners of the web are gathered into the tape to form reversible cups.

12. The article of claim 1 wherein the obverse finish layer and the reverse finish layer are attached to the web at their edges.

13. A method for reversibly mounting an upholstery dress cover, comprising:
    folding a tape and ribbon to a reverse face of a fabric web;
    stretching the web across a seat frame with the reverse face of the web toward the seat frame;
    inserting the tape and ribbon into a groove of the seat frame;
    removing the tape and ribbon from the groove;
    folding the tape and ribbon to an obverse face of the web;
    stretching the web across the seat frame with the obverse face of the web toward the seat frame; and
    inserting the tape and ribbon into the groove.

14. A method for making a reversible upholstery dress cover, comprising:
    attaching an obverse finish layer to an obverse face of a fabric web;
    attaching a reverse finish layer to a reverse face of the web;
    attaching to an edge of the web a tape that is folded around a ribbon in a first fold so that the ribbon extends along a midline of the tape, then each edge of the tape is folded back in a second fold to form flaps that extend beyond the first fold, with the ribbon protruding from the folded tape, wherein the tape is attached to the ribbon by a seam between the folds and the tape is attached to the edge of the web by a seam through the flaps.

15. The method of claim 14 wherein the seam through the flaps is made through the obverse finish layer and the reverse finish layer.

16. The method of claim 14 further comprising making a cutout through the web and attaching a pillow to the web within the cutout.

17. The method of claim 16 wherein the pillow protrudes equally from each face of the web.

18. The method of claim 16 further comprising capturing the pillow between the obverse finish layer and the reverse finish layer.

* * * * *